United States Patent [19]
Sigel

[11] Patent Number: 5,168,531
[45] Date of Patent: Dec. 1, 1992

[54] REAL-TIME RECOGNITION OF POINTING INFORMATION FROM VIDEO

[75] Inventor: Claude Sigel, Colorado Springs, Colo.

[73] Assignee: Digital Equipment Corporation, Maynard, Mass.

[21] Appl. No.: 722,082

[22] Filed: Jun. 27, 1991

[51] Int. Cl.⁵ .............................................. G06K 9/46
[52] U.S. Cl. ....................................... 382/48; 382/42; 382/16; 340/709
[58] Field of Search ....................... 382/42, 59, 48, 19, 382/16; 340/706, 709

[56] References Cited

U.S. PATENT DOCUMENTS

| 3,701,095 | 10/1972 | Yamaguchi et al. | 382/19 |
| 4,468,694 | 8/1984 | Edgar | 382/48 |
| 4,783,833 | 11/1988 | Kawabata et al. | 382/22 |
| 4,884,225 | 11/1989 | Fogarty et al. | 382/42 |
| 4,905,296 | 2/1990 | Nishihara | 382/42 |
| 5,014,327 | 5/1991 | Potter et al. | 382/14 |
| 5,059,959 | 10/1991 | Barry | 340/709 |

OTHER PUBLICATIONS

P. Cohen & E. Feigenbaum, The Handbook of Artificial Intelligence, vol. 3, William Kaufmann, Inc., Los Altos, Calif., 1982, pp. 127-321.
C. A. Cruz and H. J. Meyers, "Associative Networks II," Palo Alto Scientific Center Report No. G320-3446, IBM Palo Alto Scientific Center, Palo Alto, Calif. (Oct. 1983).

Primary Examiner—Leo H. Boudreau
Assistant Examiner—Steven P. Klocinski
Attorney, Agent, or Firm—Arnold, White & Durkee

[57] ABSTRACT

An occurrence of a predefined object in an image is recognized by receiving image data, convolving the image data with a set of predefined functions to analyze the image data into occurrences of predefined elementary features, and examining the occurrences for an occurrence of a predefined combination of the elementary features that is characteristic of the predefined object. Preferably the image data are convolved directly with a first predefined function to determine blob responses, and a second predefined function to determine ganglia responses indicating edges of objects. Then the ganglia responses are convolved with a third predefined function to determine simple responses indicating lines in the image, and the simple responses are combined with the ganglia responses to determine complex responses indicating terminated line segments in the image. A pointing finger, for example, is recognized from the combination of a blob response and a complex response. The method, for example, permits a data input terminal to recognize in real time the presence, position, and orientation of a pointing finger, to eliminate the need for data input devices such as "mice" or "joysticks." Therefore a user can direct an application program in the most natural way, without the distraction of manipulating a data input device.

29 Claims, 11 Drawing Sheets

REAL-TIME RECOGNITION OF POINTING INFORMATION FROM VIDEO

BACKGROUND OF THE INVENTION

1. Field of the Invention

The present invention relates generally to pattern recognition and associative networks, and more particularly to automatic visual recognition. The invention specifically relates to image recognition of a predefined object by analyzing image data into occurrences of predefined elementary features, and examining the occurrences for a predefined combination that is characteristic of the predefined object.

2. Description of the Background Art

Pattern recognition of image data has used a variety of techniques. At a basic level, pattern recognition is a process of comparison or correlation with predefined patterns. This process of correlation or comparison has been carried out directly for tasks such as character recognition. Parallel associative memories have been developed for performing, in parallel, comparison operations with a multiplicity of stored patterns. It is also known that Fourier transform techniques can sometimes be used to perform correlations and convolutions with increased computational efficiency.

In a known method, video data are processed to emphasize a particular feature of an object, such as the edge of the object, before attempting to match the video data to the predefined patterns. This technique is successful for recognizing simple objects, but the computation requirements preclude real-time pattern recognition for many applications. Moreover, this technique is quite sensitive to noise and extraneous background objects.

Pattern recognition has also been performed using neural and associative networks An associative network, for example, consists of simple processors known as "nodes" that are interconnected by communication paths called "links." Nodes perform a number of primitive operations on information reaching them via links from other nodes. Specifically, nodes form a thresholded and range limited weighted summation of the current values of all source nodes. The weights used are associated with the source-to-sink links for each sink node. Performance of the preceding node operations produces a numeric "current node value" for each node at each instant of time. A node which currently has a non-zero node value is said to be "firing." It is these node values which are transmitted between nodes, with one time step required to send a value from a node to a directly connected neighboring node.

It is known that biological visual systems are rather efficient for pattern recognition of image data. In a biological system, light forming an image is focused on a retina, where it is absorbed by receptor cells (rods and cones). These cells transform the light information into neural signals that are sent to the brain. But while still in the retina, the receptor information is processed by ganglion cells, which perform a two-dimensional convolution. There is approximately one ganglion cell for every receptor location, but the ganglion's response is determined by a fuzzy spatial average of many nearby receptors. The ganglion responses are sent to the brain, where they are transformed by simple cells, which respond only to a large number of excited ganglion responses in a straight line, of a particular orientation, and at a particular retinal location. Complex cells add to the simple cell exclusivity the notion of being end-stopped; they respond only to a line segment, and not to an infinitely long line. The complex responses proceed to the rest of the brain, where perception occurs in a manner that is not yet understood.

Associative networks have been proposed for implementing low-level vision. Low-level vision has been defined as the domain that deals with the steps of the visual processing problem leading up to the construction of "symbolic" models of the content of a visual scene. Thus, low-level vision has been said to involve usually spatial filtering of the raw image data, intensity edge detection, motion detection across the visual field, image sub-pattern grouping into hypothesized objects, extraction of object distance through the use of binocular images, etc. It has been recognized that an operator such as a two-dimensional Gaussian filter may be viewed as a function which is convolved with the image data, or the filter function may also be considered to be applied locally to each pixel of the image in a "step and repeat" fashion that lends itself to associative network implementation. It has been proposed to carry the data representation process in the associative processor to the full "primal sketch" for a usefully large retinal array. At this level, the intensity values of an image are decomposed into a set of primitive features such as zero crossings, blobs, terminations and discontinuities, and others.

SUMMARY OF THE INVENTION

In accordance with a basic aspect of the invention, a digital computer is operated to recognize an occurrence of a predefined object in an image by the steps of receiving image data representing samples of the image at spaced locations in the image, convolving the image data with a set of predefined functions to analyze the image data into ocurrences of predefined elementary features, and examining the occurrences of predefined elementary features for an occurrence of a predefined combination of the elementary features that is characteristic of the predefined object.

In a preferred implementation of the invention, the image data are convolved with the set of predefined functions by convolving the image data with a first predefined function to determine blob responses indicating regions of similar luminance, convolving the image data with a second predefined function to determine ganglia responses indicating edges of objects, convolving the ganglia responses with a third predefined function to determine simple responses indicating lines in said image, and combining the simple responses and the ganglia responses to determine complex responses indicating terminated line segments in said image; and combinations of blob responses and complex responses are examined for an occurrence of a predefined combination that is characteristic of the predefined object.

In accordance with another aspect of the invention, information is received from a human operator at a computer terminal in response to a pointing finger of the human operator. In this case the information is received by scanning a region of space near said computer terminal to obtain image data representing samples of an image at spaced locations near said computer terminal, and analyzing the image data to recognize when the pointing finger is present in the image and to determine the position of the pointing finger in the image when the pointing finger is present.

Another aspect of the invention is a data input terminal for a digital computer that is responsive to finger pointing information. The data input terminal includes a video display for displaying an image to a human operator, a video camera mounted for scanning a region of space near said image and providing a video signal, an analog-to-digital converter receiving said video signal and providing digital samples of image data, and digital computing means for receiving said digital samples of image data and analyzing said image data to recognize when a pointing finger of a human operator is present in the image data and to determine the location of the pointing finger in the image when the pointing finger is present.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Figure 1:
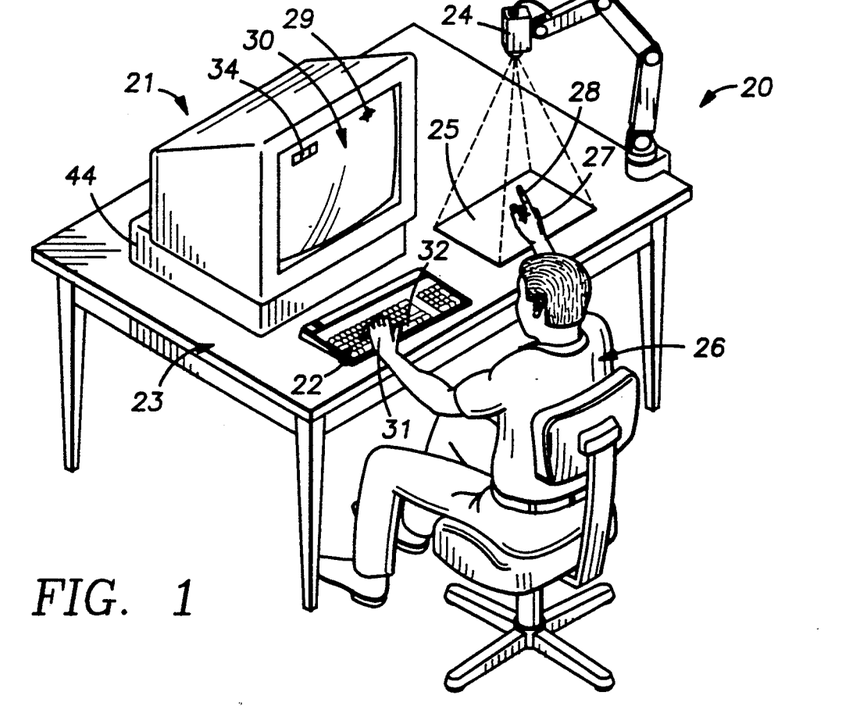
FIG. 1 is a perspective view of a data input terminal of the present invention for receiving information from a human operator in response to a pointing finger.

Turning now to FIG. 1, there is shown a perspective view of a data input terminal 20 in accordance with one aspect of the present invention. As shown, the data input terminal includes a conventional video display 21 and keyboard 22 set upon a desk or work table 23. The data input terminal further includes a video camera 24 aimed at an image area 25 of the surface of the desk 23 over which a human user 26 can move his finger into. This image area 25 is located, for example in the position at which a conventional "mouse" (not shown) otherwise might be used. In accordance with an important aspect of the present invention, however, the data input terminal 20 uses the video camera 24 to obtain an image including the user's hand 27, and the input terminal recognizes the presence, position and orientation of a pointing finger in the image in order to replace the data input function of the conventional "mouse".

To provide input data to an application program, for example, the data input terminal 20 responds to recognition of the presence and position of the user's pointing finger 28 by displaying a cursor 29 at a position on a video display screen 30 corresponding to the position of the user's pointing finger over the image area 25. When the cursor 29 has been moved to a desired location of the video screen 30, the user 26 may use his or her other hand 31 to activate the space bar 32 or another key on the keyboard 22 so that the cursor coordinates at that time are passed to the application program. In this fashion, the user could enter coordinate information for a graphics application, or select windows, pop-up windows, or interactively adjust parameters for the application program.

The application program could also use the orientation of the user's pointing finger 28 to select options or adjust parameters. The application program, for example, uses the angle of the user's finger (i.e., whether the finger points outward or right or left with respect to the user 26) to indicate a selected position on a bar graph, and the selected position is entered when the user 26 strikes a key on the keyboard. This technique could be used to enter discrete selections in lieu of the conventional push-buttons on a "mouse" (not shown), and it could also be used to enter a variable selection or provide a variable interactive control input for an application.

The application program, for example, could use the finger angle to adjust a "slider" on a bar graph representing a set point for a control meter, with the direction of the change following the pivoting of the user's finger. A displayed control parameter could be increased or decreased at a rate depending on how far the angle of the pointing finger deviates from an approximate outward position. In this fashion the user, for example, could quickly adjust "key click" volume, or control the speed of a motor (not shown) by rotating his or her finger in the most intuitive way. Moreover, the data terminal 20 may determine the angular orientation of the user's finger 28 regardless of the position of the user's hand in the image area 25. Therefore, the user need not worry about keeping his or her hand 27 in any particular position, and the user may think more about the application program and its data and less about the manipulation of a data input device.

Figure 2:
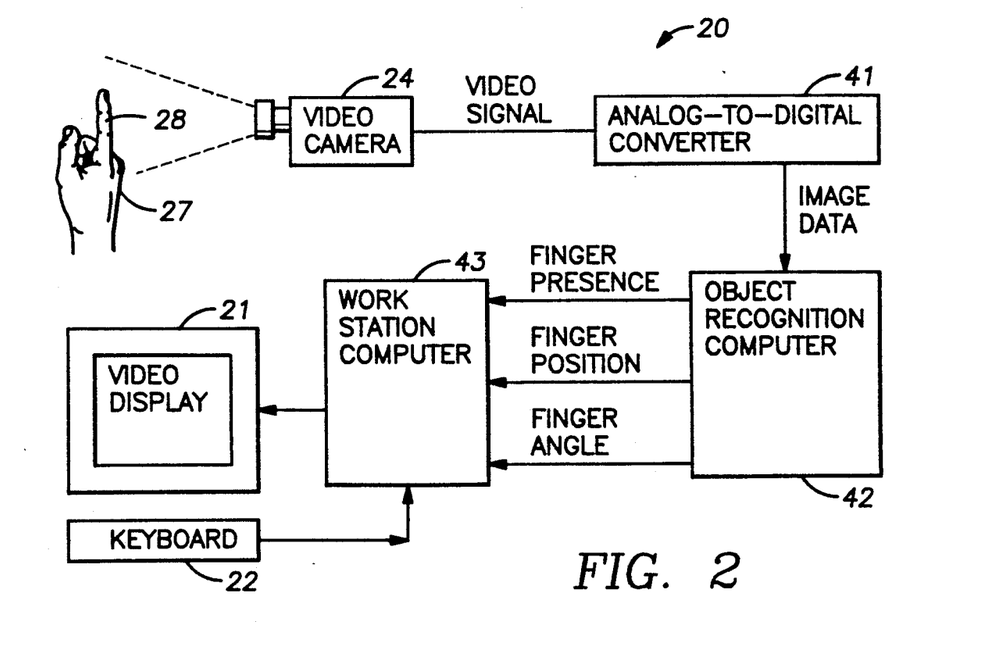
FIG. 2 is a block diagram of the data input terminal of FIG. 1.

Turning now to FIG. 2, there is shown a block diagram of the signal processing components in a preferred embodiment for the data terminal 20. The video camera 24 provides a video signal that is sampled by an analog-to-digital converter 41 to provide image data representing samples (i.e., pixels) of the image (from the image area 25) at spaced locations in the image. The video camera, for example, is a black-and-white camera, and the video signal is sampled by the analog-to-digital converter to provide a "frame" of 128×128 pixels, each of which is represented by an 8-bit value. The 8-bit value is the "luminance" or grayscale of the image.

As an alternative, a color video camera could be used and color information could be processed, which could aid in distinguishing fingers of different users, or an aid in picking out the finger from extraneous background objects (not shown) that might be found on a cluttered desk. Color processing, however, would require an increase in memory by a factor of about three, if the color information were processed using about the same resolution as the luminance information.

It is assumed that the user's finger 28 has good contrast against the surface of the desk 23 in the image area 25 of FIG. 1. To improve contrast, a black or white pad (not shown) of a size somewhat greater than the viewing area may be placed on the desk 23 in registration with the viewing area 25. Also, the "parity" of the video signal is a factor to consider, because the black-and-white video signal has a different polarity for a light hand on a dark background than a dark hand on a light background. As will be described below, the preferred method for recognizing a finger involves convolving the image data with a plurality of functions, and then performing some "threshold comparison" operations to detect the presence, position and angular orientation of a finger in the image. The convolutions are not sensitive to parity, but the "threshold comparisons" are. Detection of fingers of both possible parities could therefore be performed with only a modest increase in computation. Alternatively, for recognizing the user's finger 28 in the fastest possible time, the "threshold comparisons" are performed for a predetermined parity. The predetermined parity could be easily selected by selecting an inverted video signal (e.g., using an analog inverting amplifier [not shown] and a switch [not shown] to select either the input or output of the analog inverting amplifier), by selectively complementing the image data (for example by a bank of eight exclusive-OR gates [not shown], one for each wire [not shown] of an eight-bit data bus conveying the image data), or else the program steps for the threshold comparisons, as set out below, could be selected for a desired polarity (e.g., a less than comparison to a low threshold is replaced with a greater than comparison to a high threshold).

As shown in FIG. 2, the image data are fed to an object recognition computer 42. Preferably the object recognition computer is a programmable multi-processor parallel architecture computer having the capability of performing multiple vector scalar product operations simultaneously. Although a dedicated image processing computer could be constructed and used for the object recognition computer 42 (for example, using a pipeline organization suggested by FIG. 4 below), a programmable multi-processor parallel architecture computer would permit the object recognition computer 42 to be used for other application programs (such as for voice recognition, spectrum analysis, and solving field equations). A programmable multi-processor parallel architecture computer, however, could be built in such a fashion as to more easily perform the two-dimensional convolutions used for the preferred method of the present invention, as discussed below with reference to FIG. 17.

Preferably the computer terminal 20 has a separate "work station" computer that controls the display 21 in response to the keyboard 22 under the control of an application program or an operating system. The object recognition computer 42 could be fabricated on a circuit board to be placed into the housing (44 in FIG. 1) of the work-station computer 43. The object recognition computer 42, for example, sends an interrupt signal to the work-station computer when the presence of a pointing finger 28 is detected in the image area (25 in FIG. 1), and also sends coordinates of the pointing finger and the angle of the pointing finger.

Figure 3:
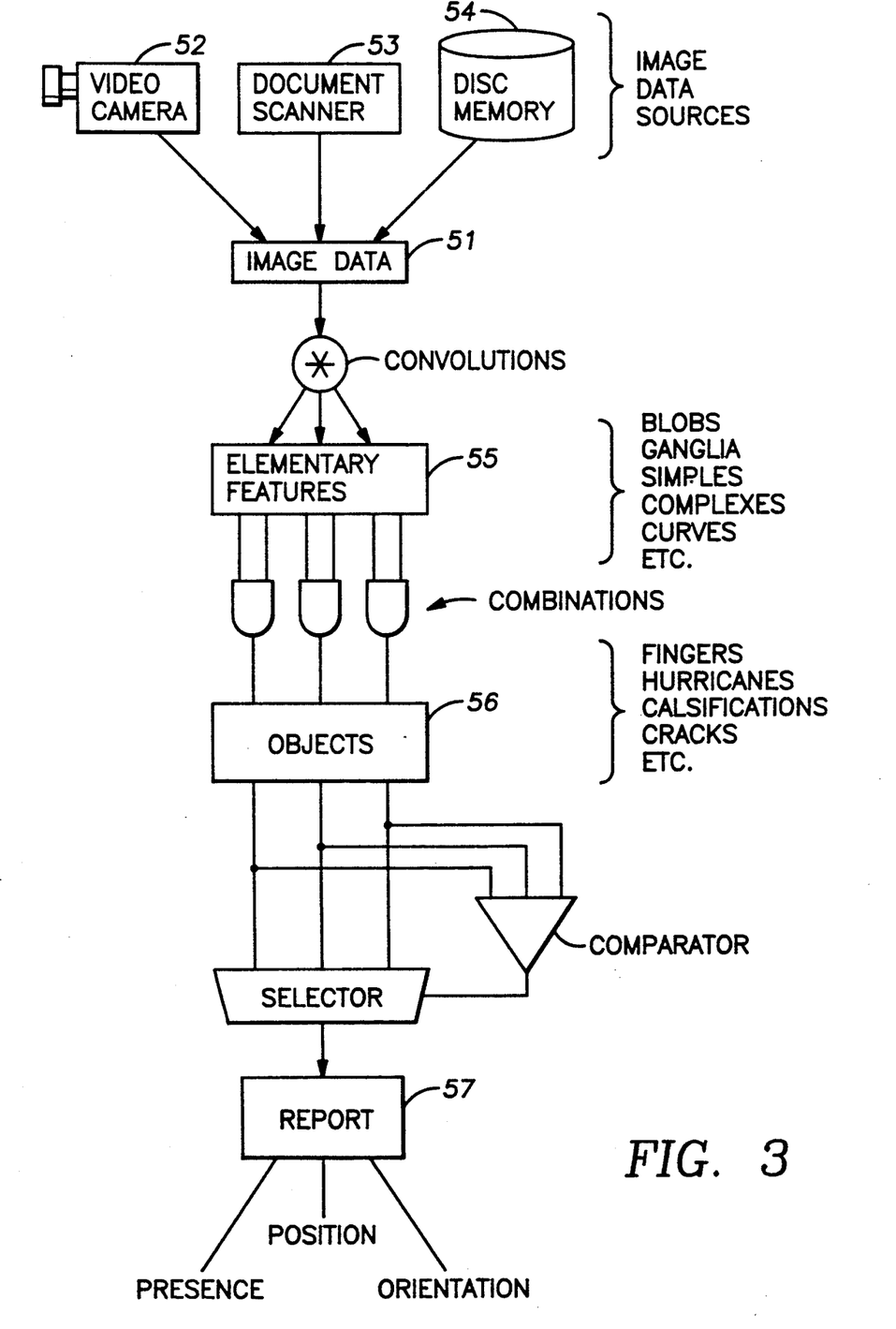
FIG. 3 is a flow diagram showing the method of the present invention being used for recognizing the occurrence of a predefined object in an image.

Turning now to FIG. 3, there is shown a flow diagram illustrating the basic method of the present invention for recognizing an occurrence of a predefined object in an image. In a first step, image data 51 are received from an image data source such as a video camera 52, a document scanner 53, disc memory 54, or other source such as a video tape player (not shown) or other computers (not shown) in a computer network (not shown). Next, the image data are convolved with a set of predefined "kernel" functions to analyze the image data into occurrences of predefined elementary features 55. The elementary features include, for example, blobs indicating regions of neighboring spaced locations, ganglia indicating edges of objects in the image, simples indicating lines in the image, complexes indicating terminated line segments in the image, and curves in the image. The terms "ganglia", "simples" and "complexes" are taken from human anatomy, where they are used in a similar fashion to denote nerve cells that are believed to resolve an image on the retina of the eye into nerve impulses responsive to the respective elementary features in the image on the retina.

Next, the elementary features are examined for an occurrence of a predefined combination of occurrences of the elementary features that is characteristic of the predefined object. Examples of objects of interest include fingers, hurricanes in weather satellite images, calcifications in mammogram images, cracks in X-ray images, and numbers on the backs of sports uniforms during the televising of a game. Moreover, in some applications it would be desirable to permit the user to define an object of interest in an interactive fashion by specifying combinations of the predefined features, or by supplying examples of objects of interest, or by identifying one or more occurrences of one or more objects of interest in one or more images.

In many cases a number of possible occurrences of an object of interest will be found in an image, but an application program will require information about the occurrence that is most likely to be a particular object of interest. In this case, the objects are compared and one is selected, and a report 57 is made of the selected object, such as the object's position in the image, and the object's orientation provided that the object is asymmetrical. The comparison, selection and determination of the object's position and orientation, for example, is based on the numerical values of the convolutions computed to analyze the image data into the occurrences of the predefined elementary features. The selection of objects could also be performed on the basis of color when the image includes color information, and on a previous identification of an object at a similar position and orientation in a previous image frame in a series of image frames taken at spaced instants in time. In the last case, for example, it is assumed that the acceleration of the object is limited, so that the object should follow a trajectory.

For real-time recognition of a pointing finger at the computer terminal 20 in FIG. 1, for example, at a standard video frame rate of 30 frames per second, it can be assumed that the pointing finger can move only a relatively short distance across the image area (25 in FIG. 1). Therefore, once the position of the pointing finger has been established in a first frame, only a sub-section of a next frame need be searched to determine the fingers's next position.

It can also be assumed that the pointing finger should have some movement when the user desires to use it for data entry into the computer terminal. Therefore, negative feedback can be used at any point in the object detection process to reduce the contribution from non-moving objects that might be found on a cluttered desk. Non-moving finger-like objects in the image area 25 will not be recognized as a pointing finger. Moreover, as long as the pointing finger is kept moving, its contrast will appear to be higher than non-moving objects. This allows the data input terminal 20 in FIG. 1 to work in a real-world environment.

Figure 4:
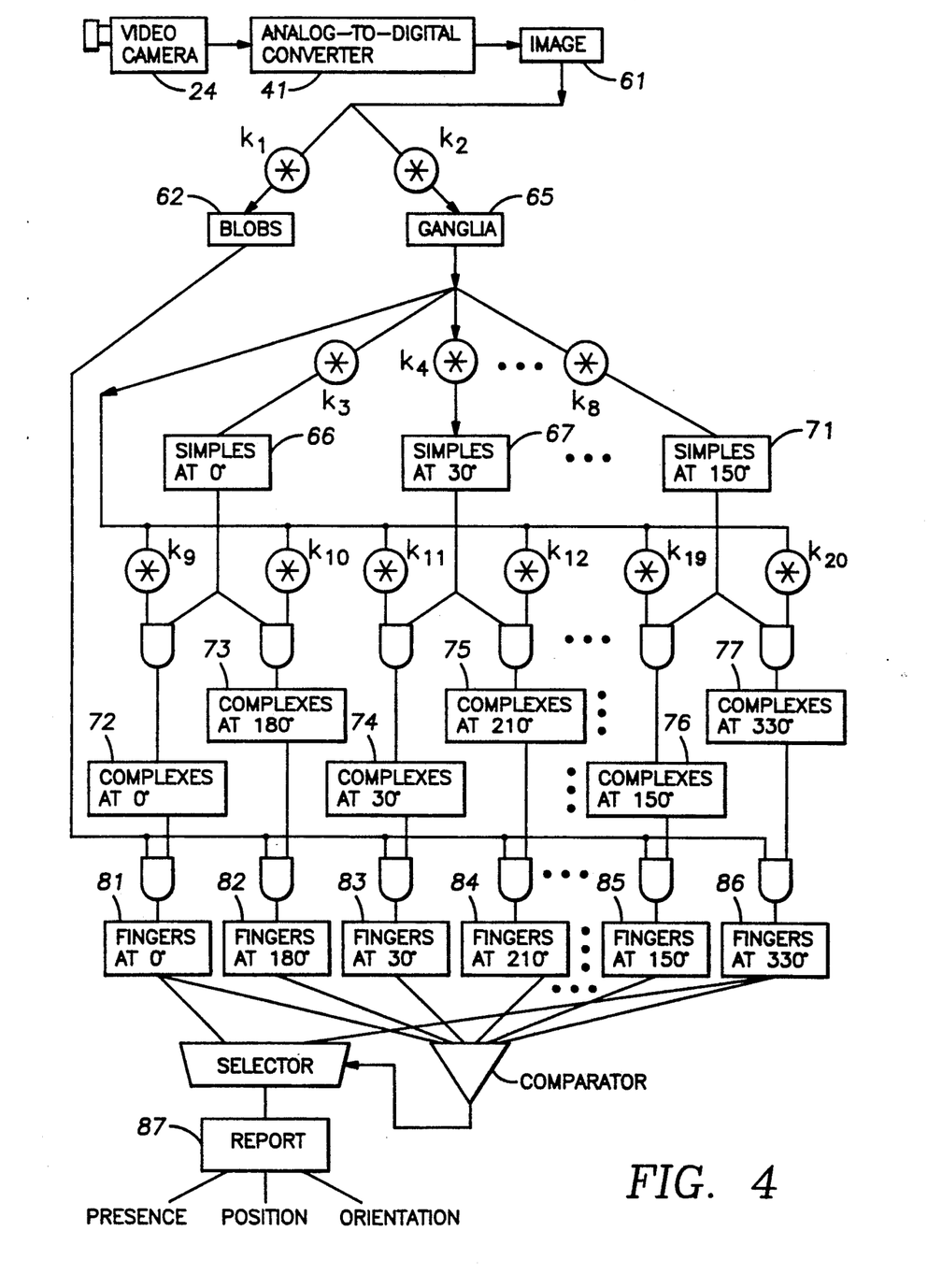
FIG. 4 is a flow diagram illustrating the preferred method of the invention being used for recognizing the presence, position, and orientation of a pointing finger.
Figure 5:
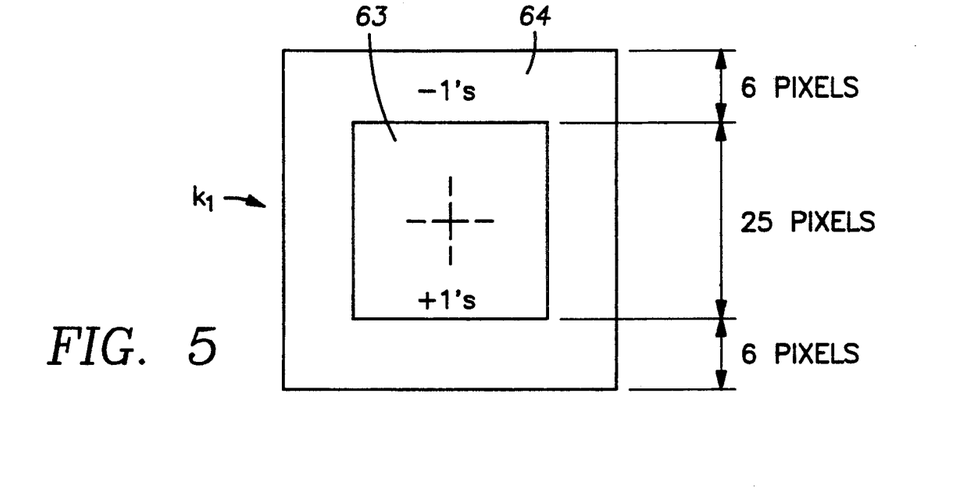
FIG. 5 is graphical representation of a first kernel function that is convolved with image data for determining blob responses.

Turning now to FIG. 4, there is shown a flow diagram of the preferred data flow through the object recognition computer 42 of FIG. 2 for recognizing a pointing finger. Image data 61 from the analog-to-digital converter 41 is initially stored in an 128×128×8-bit array, and is directly convolved with a first kernel function $k_1$ to determine blob responses 62. This first kernel function $k_1$ is graphically illustrated in FIG. 5, and it includes non-zero values in a 25×25 pixel square array of 1's, surrounded by a 6-pixel wide border area of −1's. The size of 25×25 array of +1's in the kernel $k_1$ is chosen to match the size of the user's fist. Because the kernel $k_1$ is large, the constant values of +1 and −1 are used to speed computation, so that multiplications are not required for computing the blob responses. To further save computations, a blob response is not computed at every pixel location, but instead is computed at every 4th pixel location in both the x and y directions (i.e., the blob response is "sub-sampled"). The blob responses therefore can be stored in a 32×32×8 bit array after scaling. The convolution of the image data with the kernel $k_1$ in effect is a low-pass spatial filtering operation, so that the blob responses represent a blurred version of the image.

Figure 6:
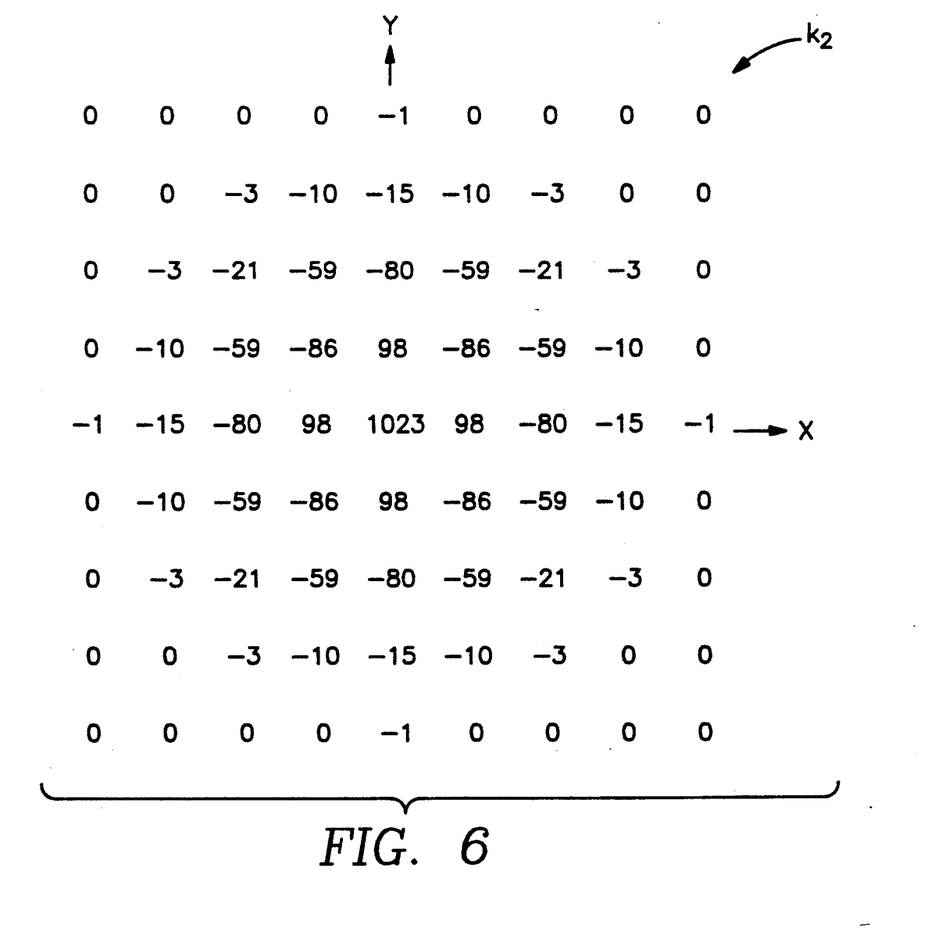
FIG. 6 is a graphical representation of a second kernel function that is convolved with image data for determining ganglia responses.

Returning to FIG. 4, the image data 61 is also directly convolved with a second kernel function $k_2$ to determine ganglia responses 65. The kernel $k_2$ is shown in FIG. 6 and it includes non-zero values in a 9×9 pixel array, each having a respective 10-bit value. The numerical values for the kernel $k_2$ were determined as the difference between two gaussian functions, to optimize edge detection of a pointing finger having a width of about 4 pixels. A ganglia response is computed for each pixel, and each response is scaled for storage in a 128×128×8-bit array.

Figure 7:
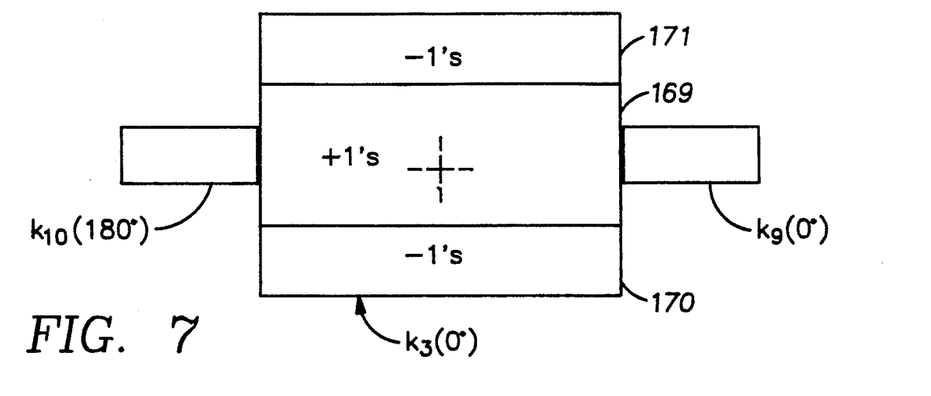
FIGS. 7 to 12 are graphical representations of kernel functions that are convolved with ganglia responses for determining simple responses and corresponding end-stop responses for a respective angular orientation for each figure.
Figures 8, 9:
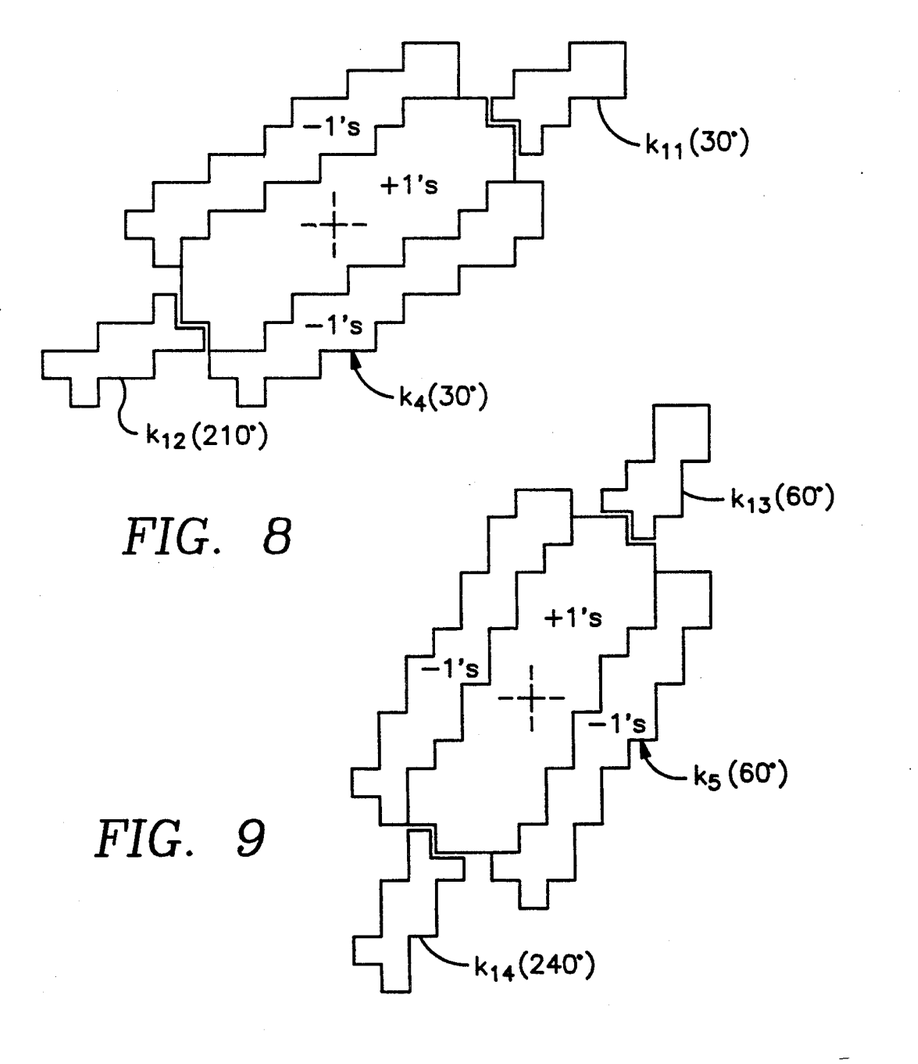
Figures 10, 11:
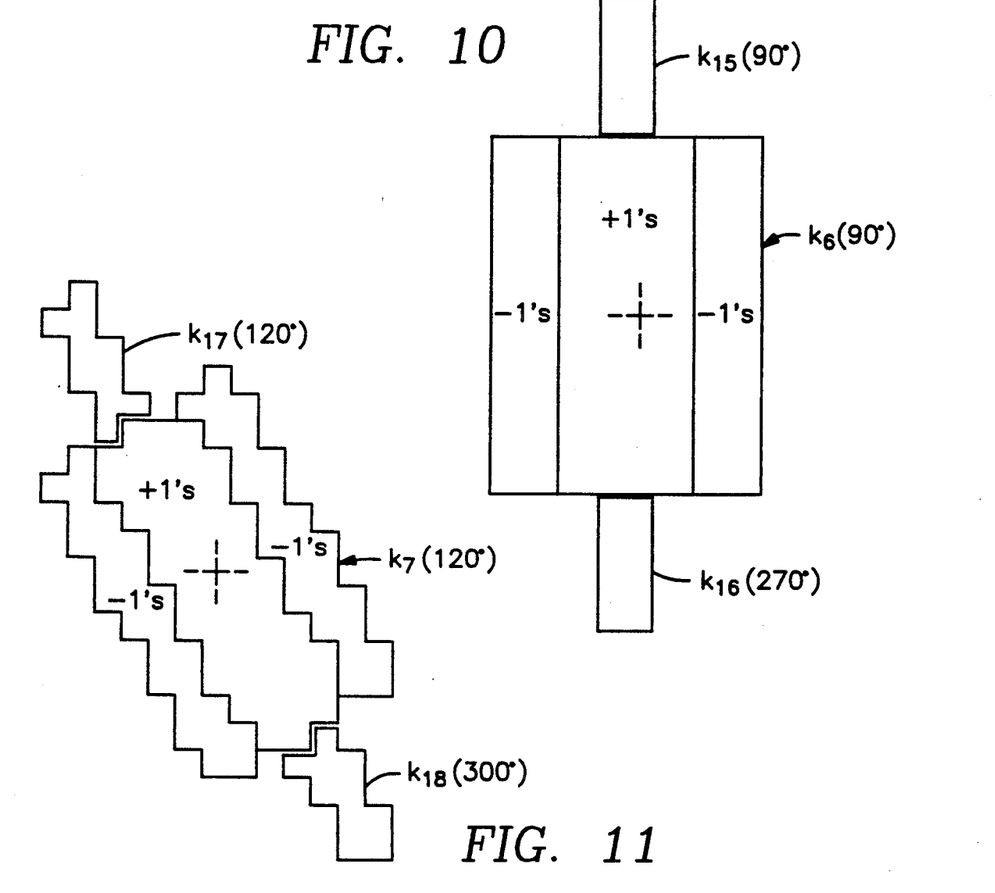
Figure 12:
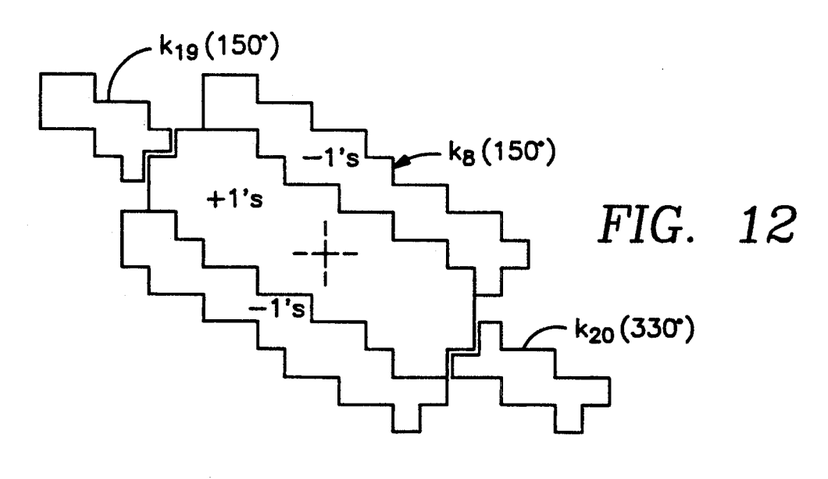

Returning to FIG. 4, the ganglia responses 65 are convolved directly with six kernel functions $k_3$ to $k_8$ to compute simple responses 66 to 71 indicating responses to straight lines in the image at particular locations and having respective angular orientations of 30° increments (i.e., 0°, 30°, . . . , 150°). For each orientation, there is a simple response corresponding to every pixel, so that the simple responses are scaled and then stored in a 6×128×128×8-bit array. As shown in FIG. 7, the non-zero portion of the kernel $k_3$ includes a 13×4 array 169 of 1's, corresponding to the portion of a pointing finger extending from a fist, surrounded by flanking regions 170 and 171, each of which includes a 13×2 array of −1's.

Returning to FIG. 4, the simple ganglia responses 65 are convolved with "end stop" kernel functions $k_9$ to $k_{20}$ and combined with respective simple responses 66 to 68 to obtain complex responses 72 to 77. The "end stop" kernel functions $k_9$ to $k_{20}$ are shown in FIGS. 7 to 10 along with the kernel functions of their corresponding simple responses. Each "end stop" kernel function $k_9$ to $k_{20}$ defines a region of 10 pixels, about 5 pixels long and about 2 pixels wide, located off an end of the kernel for its corresponding simple response. A complex response for a particular angular orientation resembles the simple response along the same line, but the complex response also requires that the line not be too long: the line must be stopped at a respective end location relative to the central location of the simple response. Preferably the complex response is computed by first comparing the simple response to a first predetermined threshold, and for each simple response that exceeds the threshold, computing each of the two respective "end stop" responses associated with the simple response. The "end stop" responses are computed, for example, by inspecting each of the ganglia responses in the respective "end stop" region, and counting the number of such ganglia responses that are less than a certain minimum value. Then the "end stop" response is compared to a second predetermined threshold, and for each "end stop" response that is greater than the second predetermined threshold, setting its respective complex response to the value of its corresponding simple response. A strong horizontal complex response directed at 0°, for example, thus indicates that there is a strong horizontal simple response at the same pixel, and also no significant ganglia responses displaced to the right; similarly, a strong horizontal complex response directed at 180° indicates that there is a strong horizontal simple response at the same pixel, and also no significant ganglia responses displaced to the left. Thus for each simple response there are two complex responses; there are six simple responses and 12 complex responses for each pixel, assuming that the simple responses for each pixel have respective angular orientations that are at multiples of 30°.

Returning to FIG. 4, the blob responses 62 are combined with complex responses 72 to 77 to provide finger responses 81 to 86. Preferably a finger response is zero unless there is the simultaneous occurrence of a substantial complex response (indicating a finger-like object) and, displaced in the opposite angular direction of the complex response, a substantial blob response (indicating a fist-like object). If such a combination of a complex response and a blob response is found, then the value of the finger response is set to the complex response; otherwise, the value of the finger response is set to zero.

In some images, there is more than one significant (i.e., non-zero) finger response. This is sometimes due to an aspect of the image that seems "finger-like", such as a shirt stripe or a pencil. Sometimes, due to the breadth of the simple kernels $k_3$ to $k_8$, more than one position or angular orientation of finger response will be significantly large. Therefore, to provide a report 87 of finger presence, position, and orientation, the finger responses are compared to select the finger response that has the maximum value. When the maximum value exceeds a predetermined threshold, the presence of the finger is reported by an interrupt to the application program to update the position of the cursor on the display screen. When there is a finger present, an interpolation can be performed between the position of the maximum finger response and the neighboring finger response at the same angular orientation having the next largest response to provide a more precise position of the user's pointing finger. In addition, an interpolation can be performed between the maximum finger response and the finger response at the same position and the one of the two neighboring angular orientations having the next largest response to provide a more precise angular orientation of the user's pointing finger.

After reporting the presence, position and angular orientation of the user's finger, the finger recognition process of FIG. 4 is repeated with a new frame of image data.

Figure 13:
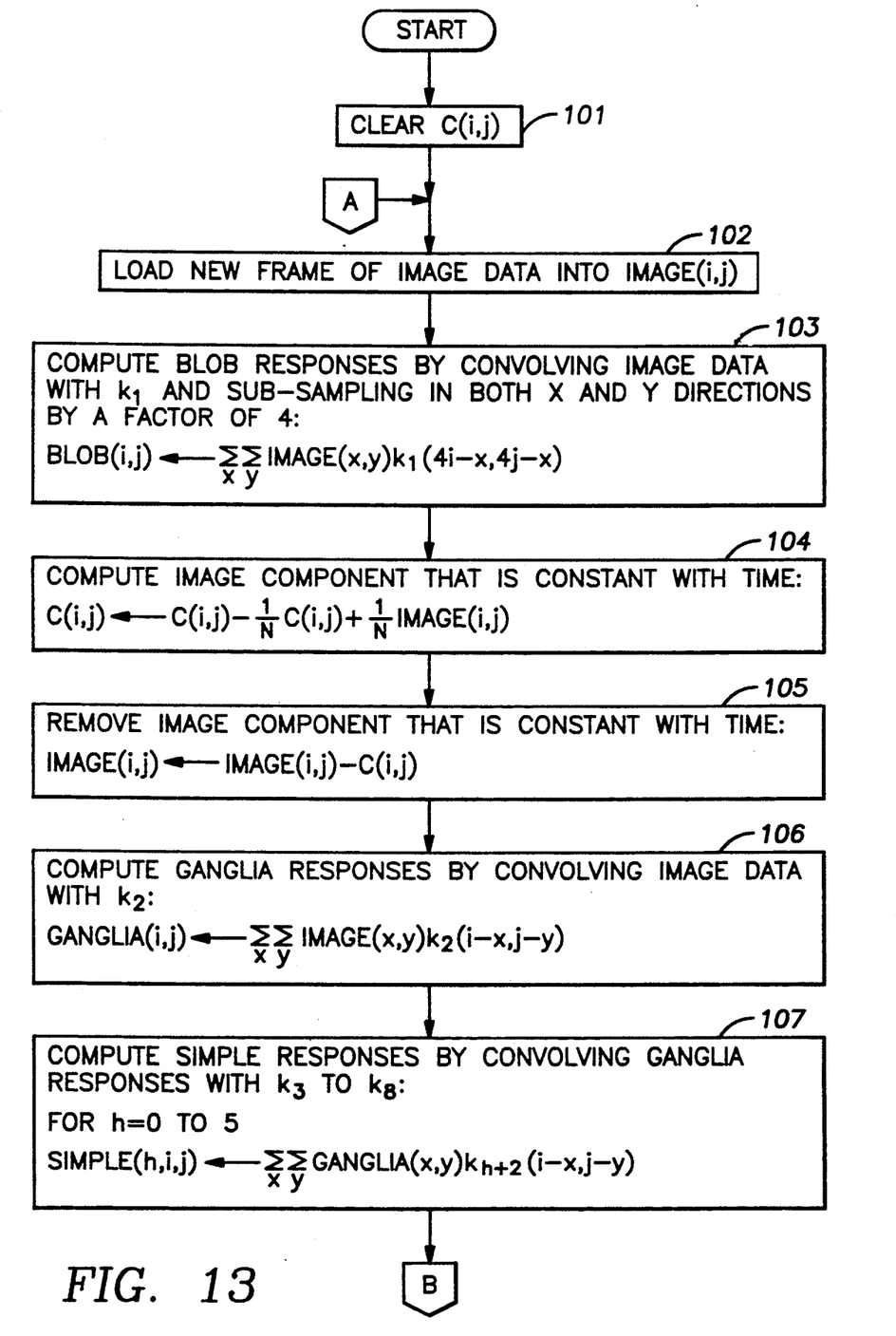
FIGS. 13 to 16 together comprise a flowchart of a procedure for operating a digital computer system for performing the preferred method of recognizing the presence, position, and orientation of a pointing finger as introduced in FIG. 4.

Turning now to FIG. 13, there is shown a flowchart of a procedure for operating a digital computer to perform the finger recognition process of FIG. 4. In a first step 101, a first frame buffer C(i,j) is cleared. This first frame buffer C(i,j) is used for performing a time integration of the image data at the same pixels between successive frames to extract image data that remains constant with time.

In step 102 a new frame of image data are loaded into a second frame buffer IMAGE(i,j). Then in step 103 the blob responses are computed by convolving the image data in the second frame buffer IMAGE(i,j) with the first kernel function $k_1$, while sub-sampling in each of the x and y directions by a factor of 4.

In step 104, the image component that remains constant with time is computed by performing a "leaky bucket" accumulation of the image data into the first frame buffer. At each pixel location, the value in the first frame buffer C(i,j) is decreased by a fraction of the original value and increased by a fraction of the new image value. For computational simplicity, the fractions are chosen to be a power of two, so that the fractions correspond to an arithmetic shift operation. Then in step 105 the image data that remains constant with time is suppressed or removed from the image data in the second frame buffer IMAGE(i,j) by subtracting the values in the first frame buffer C(i,j) from the corresponding values in the second frame buffer IMAGE(i,j) and storing the differences in the second frame buffer IMAGE(i,j). This is done to suppress the ganglia, simple, and complex responses that are constant with time. The blob responses, however, are computed from the image data before constant image components are removed, so that a moving pointing finger will be recognized even though the moving pointing finger extends from a non-moving fist.

Next in step 106 the ganglia responses are computed by convolving the image data in the second frame buffer IMAGE(i,j) with the second kernel function $k_2$. Then in step 107 the simple responses at each of the six angular inclinations are computed by convolving the ganglia responses with each of the six kernel functions $k_3$ to $k_8$.

Figure 14:
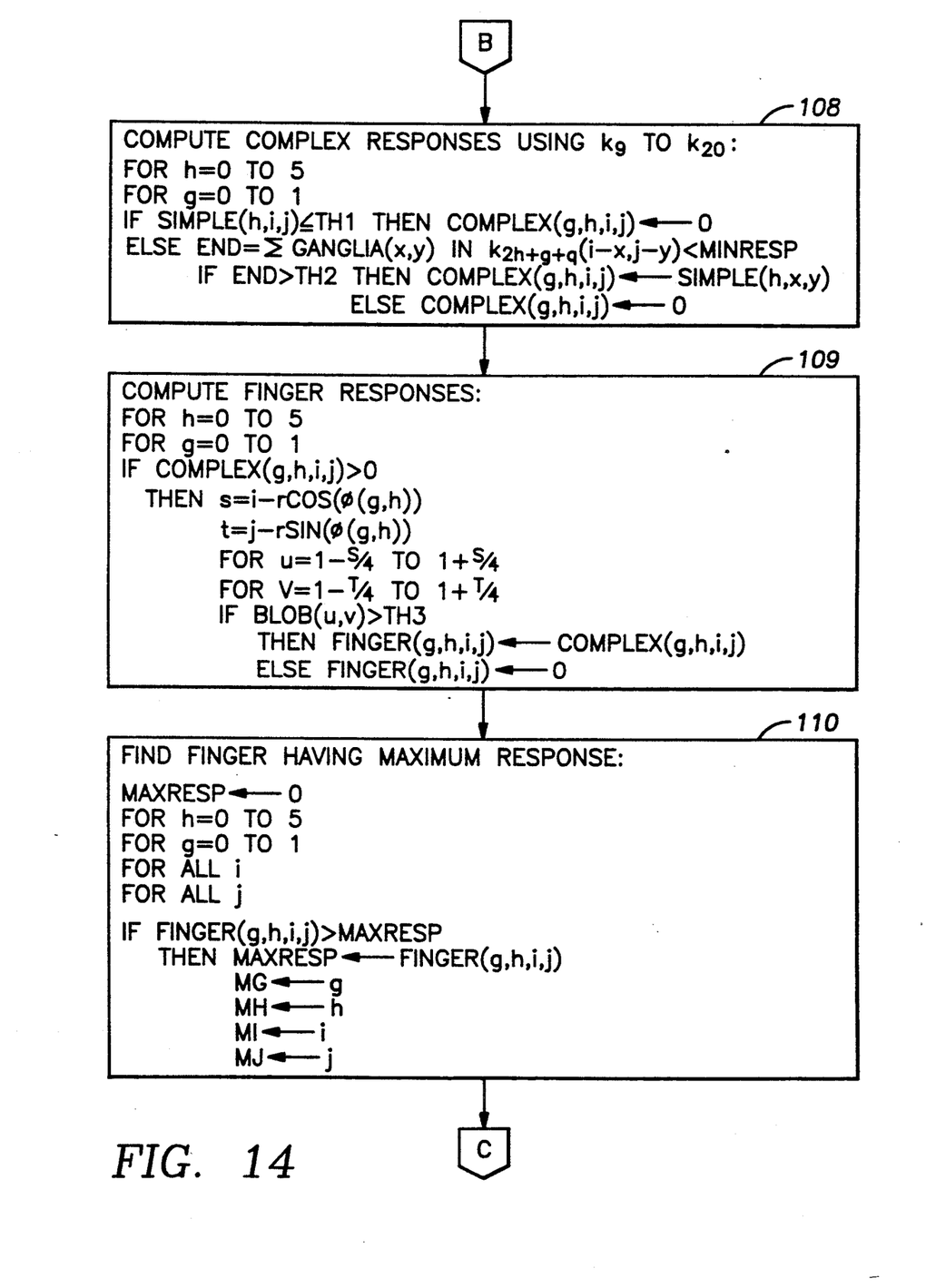

Continuing on FIG. 14, in step 108 the complex responses are computed for each of the twelve angular directions by computing the two end-stop responses for each simple response exceeding a first predetermined threshold TH1, and for each end-stop response that is greater than a second predetermined threshold TH2, setting the corresponding complex response to the simple response, and otherwise setting the corresponding complex response to zero.

In step 109 the finger responses are computed for each complex response that is greater than zero by searching for a blob response that exceeds a third predetermined threshold TH3 and is located within the neighborhood of the blob response closest to the pixel (s,t) that is a predetermined distance r (about 19 pixels) from the pixel of the complex response in the direction opposite of the direction $\phi$ of the complex response. Then in step 110 the maximum finger response is found by scanning the finger responses and performing comparison operations.

Figure 15:
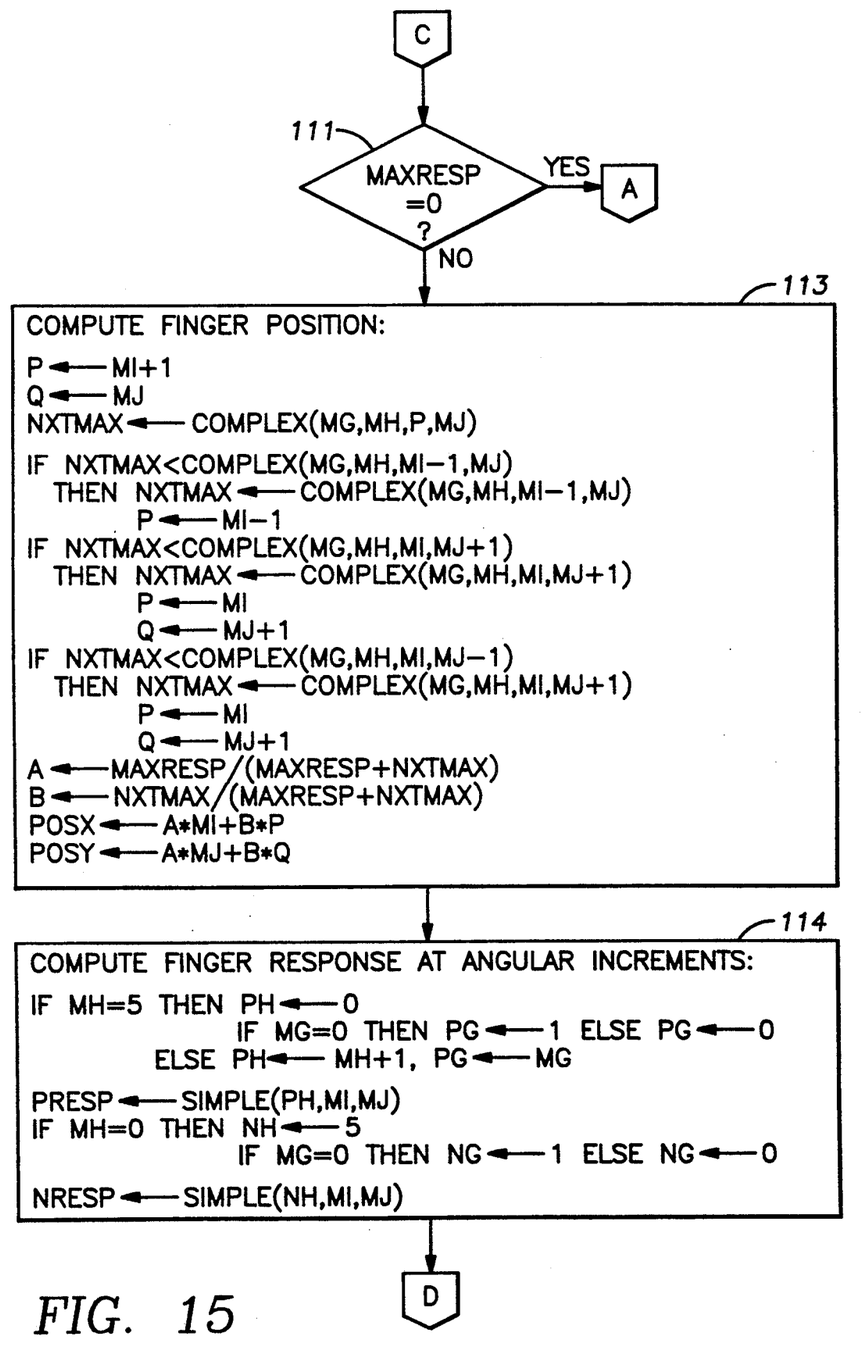

Continuing in FIG. 15, in step 111 the maximum finger response is compared to zero, and if it is zero, then execution loops back to step 102 to process a new frame of image data because a finger has not been found in the present frame of image data. Otherwise, in step 113, the finger position is computed by an interpolation between the position (MI, MJ) of the maximum finger response MAXRESP and the neighboring finger response at the same angular orientation (MG, MH) having the next largest response NXTMAX to provide a more precise position (POSX, POSY) of the user's pointing finger.

In step 114, the finger responses PRESP and NRESP are obtained at the same pixel as the maximum finger response but at the two neighboring angular orientations (PG, PH) and (NG, NH).

Figure 16:
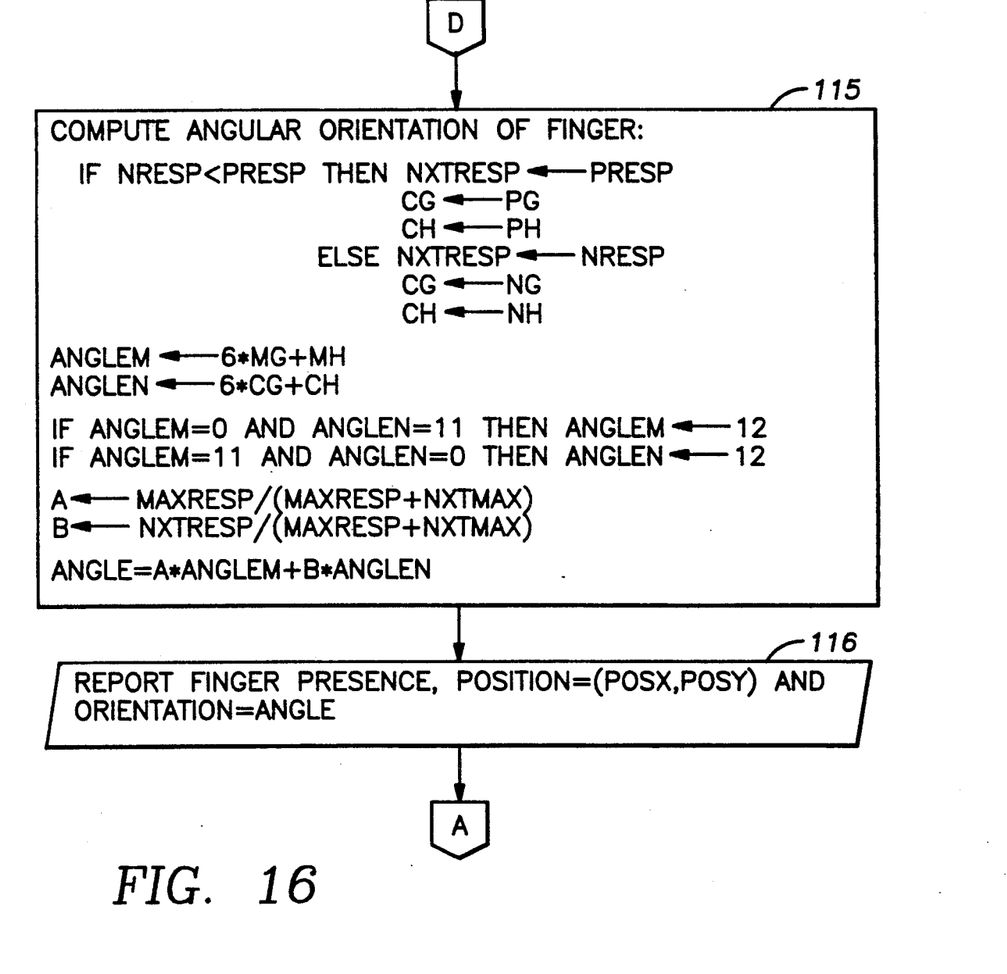

Continuing on FIG. 16, in step 115 an angular interpolation is performed between the maximum finger response and the larger one of the two neighboring responses PRESP and NRESP to provide a more precise angular orientation of the user's pointing finger.

Finally, in step 116, the presence of the user's pointing finger is reported by an interrupt to the application program, and the application program is also provided with the interpolated position and angular orientation computed for the user's pointing finger.

A specific example of a computer program for operating a digital computer to perform the finger recognition process of FIG. 4 is included in Appendix 1. The computer program in Appendix 1 was written for a "DECstation 5000" brand workstation. It requires about 29.2 seconds to process a frame of 128×128×8-bit image data, and the blob, ganglia, and simple convolutions take 28.9 seconds of the 29.2 seconds total. For near real-time processing, only the simples for 0° angular orientation can be computed. For real-time operation in the fashion described above with respect to FIG. 1 using present computer technology, however, a multiprocessor computer should be used.

Figure 17:
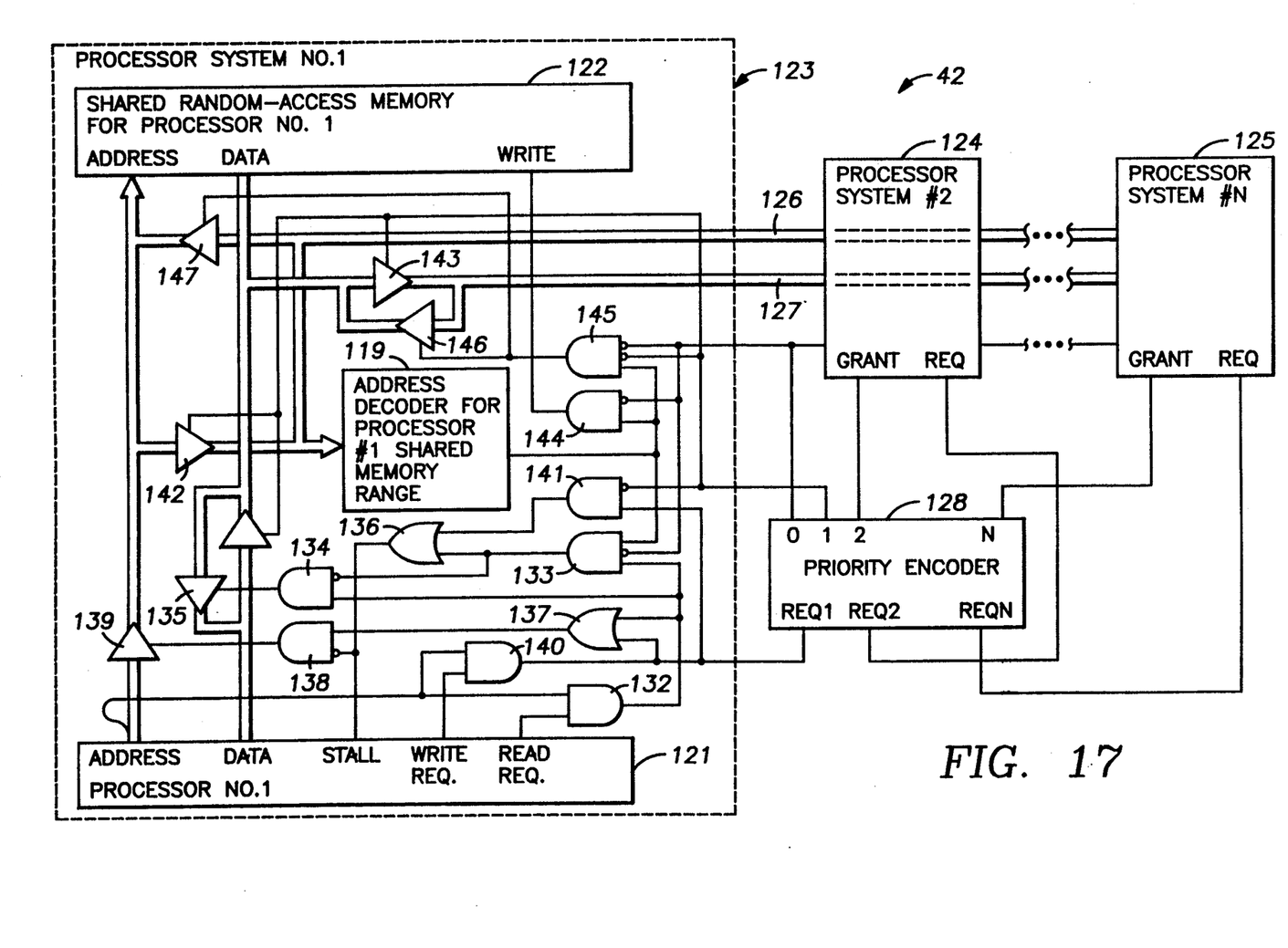
FIG. 17 shows a multi-processor system for computing convolutions.

Turning now to FIG. 17, there is shown a multiprocessor system that could be used for the object recognition computer 42 in FIG. 1. Real-time operation of the computer terminal 20 in FIG. 1 requires a minimum number of arithmetic operations per image frame, and at a given frame rate (such as the standard 30 frames per second) a minimum number of arithmetic computations per second is established. This minimum number of arithmetic computations per second requires at least a certain number N of processors 121 to be included in the object recognition computer 42.

The fastest processor presently available would be a pipelined processor capable of performing a vector scalar product upon a continuous stream of data fetched from an image buffer. When a number of such processors are used, however, each processor would have to access a different memory locations in the image buffer at the same time. Therefore, to avoid read conflicts between the processors, the image buffer would require multiple data ports. To use conventional single port random access memory and in accordance with conventional multi-processor system design, each processor in the object recognition computer 42 has a portion of shared random access memory 122, and the combinations of portions of the shared random access memory comprise at least one frame buffer. The combination of each processor with its shared random access memory makes up a separate processor system. Therefore, in the object recognition computer 42 in FIG. 17, there are N such processor systems 123, 124, 125.

Due to the nature of the convolution computations, if it is assumed that each processor reads data located in a respective preassigned region of the frame buffer, then it is necessary for the results of at least one of the processors to be written to the image buffer memory of another one of the processors. As shown in FIG. 17, one address bus 126 and one data bus 127 are provided for permitting each of the processors to transmit data to all of the other processors. Since the buses 126, 127 are shared among all of the processors, a priority encoder 128 is provided to grant priority to a selected processor requesting access to the buses when there are simultaneous requests for data transmission over the buses.

To minimize the data traffic on the shared buses 126, 127, it will be assumed that the result of a convolution to be stored at each pixel will be computed entirely by only one of the processors. This condition ensures that the bus need not transmit any partial vector scalar products from one processor system to another processor system. However, the convolution of an entire frame with a single kernel will be computed by at least two processors operating in parallel. Moreover, it will be assumed that the result of a convolution to be stored at each pixel will be computed by a respective processor by performing a vector scalar product of the convolution kernel with a vector read from the processor's shared random access memory, and then the result will be "broadcast" over the shared data bus 127. Under these assumptions, and due to the nature of the convolution operation, copies of some of the data to be convolved must reside simultaneously in more than one of the shared memories in each of the processor systems. This is a cost associated with reducing the traffic over the shared data bus 127 in the architecture of FIG. 17. It should be apparent, however, that the processing speed is now only limited by the capacity of the shared bus 127 to "broadcast" the results of the convolutions, because the number of processor systems N can be increased until the shared bus 127 becomes the bottleneck. Also, a greater number of relatively slow but inexpensive processors 121 could be used, such as common microprocessors (such as the popular Intel 80386/80387 brand microprocessors and floating-point coprocessors). Moreover, for recognizing objects according to the preferred method in FIG. 4, the maximum limit of processing speed could be increased beyond that needed for the computer terminal 20 of FIG. 1 by adding additional shared buses and corresponding frame buffers of shared memory for simultaneously broadcasting the results of the blob, ganglia, and simple convolutions on separate respective buses.

In the processor system No. 1 (123 of FIG. 17), the processor 121 addresses the shared memory by asserting a memory bank select signal or high-order address on a line 131. For a read operation, gates 132, 133, and 134 enable a data bus transmission gate 135 unless priority for a "global" write operation has been granted by the priority encoder 128 to another processor and an address decoder 119 determines that the "global" write operation addresses the shared random access memory 122 for the processor system 123, in which case the processor 121 is stalled by a gate 136. Moreover, for a read operation, gates 137 and 138 enable an address bus transmission gate 139, unless priority for a "global" write operation has been granted by the priority encoder 128 to another processor and the address decoder 119 determines that the "global" write operation addresses the shared random access memory 122 for the processor system 123.

For a write operation by the processor 121, gates 140, 137 and 138 enable an address bus transmission gate 139, unless priority for a "global" write operation has been granted by the priority encoder 128 to another processor, in which case the processor 121 is stalled by gates 141 and 136. When priority for a write operation is granted by the priority encoder 128, then transmission gates 142 and 143 are enabled to assert the write address and write data on the shared address bus 126 and shared data bus 127.

When a write address and write data are asserted on the shared address and data buses 126 and 127 and the address decoder 119 determines that the address on the shared address bus 126 falls within the address range of the shared memory 122 for the processor 121, then a gate 144 enables the shared memory 122 to perform a write operation. Moreover, when the write operation is initiated by a processor other than the processor 121, then a gate 145 enables transmission gates 146 and 147 to assert upon the shared memory 122 the address from the shared address bus 126 and the data from the shared data bus 127.

Although the inter-processor communication problem is alleviated in the multi-processor system of FIG. 17 by in effect duplicating addressable memory locations in the shared memories, a massively-parallel processor of conventional organization could be used, in which the processors are organized into an array and a multiplicity of data links are provided for inter-processor communication. In such a massively-parallel processor, each processor could be assigned the task of performing all of the partial vector scalar products associated with the convolutions upon a pre-assigned region of an input frame buffer. Each partial vector product would then be transmitted to a processor assigned to a region of an output frame buffer at which the complete vector product would be stored; that processor would sum the partial vector products to form the complete vector product, and store it in the output frame buffer.

Although the invention has been described above in connection with a preferred embodiment, many variations and modifications should be apparent to a person of ordinary skill in the art. In the computer terminal 20 of FIG. 1, for example, a voice recognition system could replace the keyboard 22 to provide entirely "hands free" operation. The voice recognition system, for example, could recognize a command to enter the coordinates of the user's pointing finger, or a command to enter a selection based on the angle of the user's pointing finger, or other commands in lieu of the pushbuttons on a conventional "mouse."

Instead of using a single video camera 24, two or three video cameras could be used to obtain images of the user's finger from different directions to obtain the coordinates and angle of the user's finger in three-dimensional space. Three cameras, for example directed along three orthogonal axes, could capture images that would be orthogonal projections of the user's pointing finger and would allow the angle of the pointing finger to be determined from any orientation of the finger in three-dimensional space. This three-dimensional finger-pointing information would be very useful to enter coordinate information, for example, to a three-dimensional graphics system using a three-dimensional video display. The user could then point to features of a three-dimensional virtual image. The three-dimensional video display, for example, could be a conventional color cathode-ray tube in which "right" and "left" stereoscopic images are displayed in respective red and blue colors and viewed through conventional 3-D glasses having respective red and blue color filters for the right and left eyes, or the three-dimensional display could be a stereoscopic "heads-up" display worn by the user.

Although a specific example of the present invention has been described using a video camera to obtain image data, the basic object recongnition method of the present invention can use various sources of image data, as shown and described above with reference to FIG. 3.

In view of the above, there has been described a method of operating a digital computer to recognize an occurrence of a predefined object in an image. The method is based upon the human visual system, which has evolved to a high state of perfection, and has a wide range of applicability. Moreover, the method can be carried out in real-time by a multi-processor computer system. The method, for example, permits a data input terminal to recognize the presence, position, and orientation of a pointing finger, to eliminate the need for data input devices such as "mice" or "joysticks." Therefore a user can direct an application program in the most natural way, without the distraction of manipulating a data input device.

What is claimed is:

1. A method of operating a digital computer to recognize an occurrence of a predefined object in an image, said method comprising the steps of:
   a) receiving image data representing samples of said image at spaced locations in said image;
   b) convolving said image data with a set of predefined functions to analyze the image data into occurrences of predefined elementary features; and
   c) examining the occurrences of the predefined elementary features for an occurrence of a predefined combination of occurrences of said elementary features that is characteristic of the predefined object;
   wherein said predefined elementary features include blobs, simples and complexes, wherein the blobs indicate regions of similar luminosity, simples indicate lines in said image, and complexes indicate terminated line segments in said image; and
   wherein the image data are convolved with a first one of said functions to provide blob responses, the image data are convolved with a second one of said functions to provide ganglia responses indicating edges of objects, the ganglia responses are convolved to provide simple responses, and the simple responses and ganglia responses are combined to provide complex responses.

2. The method as claimed in claim 1, wherein the simples include respective indications of lines at six different angular orientations at 30 degree increments.

3. The method as claimed in claim 1, wherein said predefined combination of said elementary features includes a complex extending from a blob.

4. The method as claimed in claim 3, wherein said predefined object is a human hand having a pointing finger.

5. The method as claimed in claim 1, further comprising the step of determining an angular orientation for an occurrence of said predefined combination of said elementary features that is characteristic of the predefined object.

6. The method as claimed in claim 5, wherein said predefined elementary features include lines at a plurality of angular orientations.

7. The method as claimed in claim 6, wherein said step of determining an angular orientation for an occurrence includes computing an angle from convolutions for lines at two neighboring angular orientations.

8. The method as claimed in claim 1, further comprising the step of computing a position for said occurrence of said predefined object by interpolating between positions of occurrences of said predefined combination which occur at neighboring spaced locations in said image.

9. The method as claimed in claim 1, further comprising the step d) of computing a response for a plurality of occurrences of said predefined combination of said elementary features that is characteristic of the predefined object, and determining a location for the predefined object from one of said occurrences of said predefined combination having a maximum response.

10. The method as claimed in claim 1, further comprising the step of suppressing features that remain constant with time.

11. The method as claimed in claim 1, wherein for at least one of said predefined functions, said convolving is performed by computing, for each spaced location in said image, a vector scalar product of said image data and said one of said predefined functions after shifting said one of said predefined functions so that said one of said predefined functions is centered upon said each spaced location.

12. A method of operating a digital computer to recognize an occurrence of a predefined object in an image, said method comprising the steps of:
   a) receiving image data representing samples of said image at spaced locations in said image;
   b) convolving said image data with a first predefined function to determine blob responses indicating regions of similar luminance in said image;
   c) convolving said image data with a second predefined function to determine ganglia responses indicating edges of objects;
   d) convolving said ganglia responses with a third predefined function to determine simple responses indicating lines in said image;
   e) combining the simple responses and the ganglia responses to determine complex responses indicating terminated line segments in said image; and
   f) examining combinations of blob responses and complex responses for an occurrence of a predefined combination that is characteristic of the predefined object.

13. The method as claimed in claim 12 wherein said simple responses include responses indicating lines in said image at a plurality of angular orientations, and said method further comprises the step g) of determining angular orientation for the occurrence of said predefined combination that is characteristic of the predefined object by computing an angle from two of said simple responses indicating lines having different and neighboring angular orientations.

14. The method as claimed in claim 12, wherein said predefined object is a human hand, and said predefined combination is a complex response and a blob response indicating a terminated line segment extending from a region of similar luminance in said image.

15. The method as claimed in claim 12, wherein one of said simple responses is combined with ganglia responses to provide a complex response only when said one of said simple responses has a value exceeding a predetermined threshold.

16. The method as claimed in claim 12, further comprising the step of computing a position for said occurrence of said predefined object by interpolating between positions of occurrences of said predefined combination which occur at neighboring spaced locations in said image, based upon responses computed for said occurrences of said predefined combination.

17. The method as claimed in claim 12, wherein step f) further comprises the step of computing responses for a plurality of combinations of blob responses and complex responses that are characteristic of the predefined object, and determining a location for the predefined object from the combination of blob and complex responses having a maximum response.

18. The method as claimed in claim 12, further comprising the step of suppressing responses that do not change with time.

19. The method as claimed in claim 12, wherein for each of said first and second predefined functions, said convolving is performed by computing, for each spaced location in said image, a vector scalar product of said image data and said each of said predefined functions after shifting said each of said predefined functions so that said each of said predefined functions is centered upon said each spaced location.

20. A method of operating a digital computer to receive information from a human operator at a computer terminal in response to a pointing finger of the human operator, said method comprising the step of:
   a) scanning a region of space near said computer terminal to obtain image data representing samples of an image at spaced locations near said computer terminal; and
   b) analyzing said image data to recognize when the pointing finger is present in the image and to determine the position of the pointing finger in the image when the pointing finger is present, wherein said analyzing includes convolving said image data to resolve the image data into blobs characteristic of a fist of the human operator and complexes characteristic of the pointing finger, and examining the blobs and the complexes for a combination of a complex extending from a blob to recognize the presence of the pointing finger, and wherein said convolving said image data includes: convolving said image data with a first predefined function to determine blob responses; convolving said image data with a second predefined function to determine ganglia responses indicating edges of said finger; convolving said ganglia responses with a third predefined function to determine simple responses; and combining the simple responses and the ganglia responses to determine complex responses.

21. The method as claimed in claim 20, further comprising the step of determining an angular orientation of said finger from said image data.

22. The method as claimed in claim 21, wherein said step of determining an angular orientation of said finger includes computing an angle from convolutions of the image data with predetermined functions having different angular orientations.

23. The method as claimed in claim 20, wherein said step b) is not responsive to finger-like features of said image that remain constant with time.

24. A data input terminal for a digital computer, said data input terminal comprising, in combination:
   a video display;
   a video camera mounted for scanning a region of space near said video display to provide a video signal representing an image of said region of space;
   an analog-to-digital converter receiving said video signal and providing digital samples of image data; and
   digital computing means for receiving said digital samples of image data and analyzing said image data to recognize when a pointing finger of a human operator is present in said image and to determine the location of the pointing finger in the image when the pointing finger is present;
   wherein said digital computing means includes means for convolving said image data to resolve the image data into blobs characteristic of a fist of the human operator and complexes characteristic of the pointing finger, and examining the blobs and the complexes for a combination f a complex extending from a blob to recognize the presence of the pointing finger, and
   wherein said means for convolving said image data includes means for convolving said image data with a first predefined function to determine blob responses, means for convolving said image data with a second predefined function to determine ganglia responses indicating edges of the pointing finger, means for convolving said ganglia responses with a third predefined function to determine simple responses, and means for combining the simple responses and the ganglia responses to determine complex responses.

25. The data input terminal as claimed in claim 24, wherein said digital computing means includes means for computing responses for a plurality of combinations of complexes extending from blobs, and means for determining a location for the pointing finger from one of said plurality of combinations having a maximum response.

26. The data input terminal as claimed in claim 24, wherein said digital computing means further includes means for determining an angular orientation of the pointing finger from the image data.

27. The data input terminal as claimed in claim 26, wherein said means for determining an angular orientation of said finger includes means for computing an angle from convolutions of the image data with predetermined functions having different angular orientations.

28. The data input terminal as claimed in claim 24, wherein said digital computing means further comprises means for computing the location of said pointing finger by interpolating between positions of a complex of an occurrence of said pointing finger and a complex at a neighboring location in said image.

29. The data input terminal as claimed in claim 24, wherein said digital computing means further comprises means for suppressing complexes that remain constant with time.

* * * * *